(12) United States Patent
Wei et al.

(10) Patent No.: US 11,153,072 B2
(45) Date of Patent: *Oct. 19, 2021

(54) PROCESSING BLOCKCHAIN DATA BASED ON SMART CONTRACT OPERATIONS EXECUTED IN A TRUSTED EXECUTION ENVIRONMENT

(71) Applicant: Advanced New Technologies Co., Ltd., Grand Cayman (KY)

(72) Inventors: Changzheng Wei, Hangzhou (CN); Ying Yan, Hangzhou (CN); Boran Zhao, Hangzhou (CN); Xuyang Song, Hangzhou (CN); Huabing Du, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,813

(22) Filed: Dec. 28, 2020

(65) Prior Publication Data

US 2021/0119774 A1   Apr. 22, 2021

Related U.S. Application Data

(63) Continuation of application No. 16/670,646, filed on Oct. 31, 2019, now Pat. No. 10,880,077, which is a
(Continued)

(51) Int. Cl.
  *H04L 9/06*   (2006.01)
  *G06F 9/455*   (2018.01)
  *H04L 9/32*   (2006.01)

(52) U.S. Cl.
  CPC ........ *H04L 9/0637* (2013.01); *G06F 9/45558* (2013.01); *H04L 9/0643* (2013.01);
  (Continued)

(58) Field of Classification Search
  None
  See application file for complete search history.

(56) References Cited

U.S. PATENT DOCUMENTS

| 10,171,992 B1 | 1/2019 | Viswanathan et al. |
| 2003/0133450 A1* | 7/2003 | Baum ............... H04L 45/54 |
| | | 370/389 |

(Continued)

FOREIGN PATENT DOCUMENTS

| CN | 106850200 | 6/2017 |
| CN | 107342858 | 11/2017 |

(Continued)

OTHER PUBLICATIONS

Behl et al., "Hybrids on steroids: SGX-based high performance BFT," Proceedings of the Twelfth European Conference on Computer Systems, 2017, 16 pages.

(Continued)

*Primary Examiner* — William J. Goodchild
(74) *Attorney, Agent, or Firm* — Fish & Richardson P.C.

(57) ABSTRACT

Disclosed herein are methods, systems, and apparatus, including computer programs encoded on computer storage media, for processing blockchain data under a trusted execution environment (TEE). One of the methods includes receiving, by a blockchain node, a request to execute one or more software instructions in a TEE executing on the blockchain node; determining, by a virtual machine in the TEE, data associated with one or more blockchain accounts to execute the one or more software instructions based on the request; traversing, by the virtual machine, a global state of a blockchain stored in the TEE to locate the data; and executing, by the virtual machine, the one or more software instructions based on the data.

27 Claims, 5 Drawing Sheets

Related U.S. Application Data continuation of application No. PCT/CN2019/081180, filed on Apr. 3, 2019.

(52) U.S. Cl.
CPC .... *H04L 9/321* (2013.01); *G06F 2009/45595* (2013.01); *H04L 2209/38* (2013.01)

(56) References Cited

U.S. PATENT DOCUMENTS

| | | | | |
|---|---|---|---|---|
| 2015/0244690 | A1* | 8/2015 | Mossbarger | H04L 9/006 713/171 |
| 2017/0345011 | A1* | 11/2017 | Salami | G06Q 20/10 |
| 2018/0109541 | A1* | 4/2018 | Gleichauf | H04W 12/10 |
| 2018/0309567 | A1* | 10/2018 | Wooden | G06F 21/6209 |
| 2019/0042319 | A1* | 2/2019 | Sood | G06F 9/5072 |
| 2019/0042620 | A1 | 2/2019 | Garagiola et al. | |
| 2019/0273617 | A1* | 9/2019 | Maher | H04L 9/085 |
| 2019/0288832 | A1* | 9/2019 | Dang | H04L 9/0637 |
| 2019/0306549 | A1* | 10/2019 | Dietz | H04N 21/251 |
| 2019/0394648 | A1* | 12/2019 | Tipton | H04L 63/083 |
| 2020/0019545 | A1 | 1/2020 | Ye | |

FOREIGN PATENT DOCUMENTS

| | | |
|---|---|---|
| CN | 107368259 | 11/2017 |
| CN | 108427601 | 8/2018 |
| CN | 109408521 | 3/2019 |
| JP | 2005227995 | 8/2005 |

OTHER PUBLICATIONS

Brandenburger et al., "Challenges for Combiningg Smart Contracts with Trusted Computing," ACM System Software for Tursted Execution, Jan. 2018, pp. 20-21.

Cheng et al., "Ekiden: A platform for confidentiality-preserving, trustworthy, and performant smart contracts," 2019 IEEE European Symposium on Security and Privacy, 2019, 21 pages.

Crosby et al., "BlockChain Technology: Beyond Bitcoin," Sutardj a Center for Entrepreneurship & Technology Technical Report, Oct. 16, 2015, 35 pages.

Dash.org [online], "Dash," Jan. 2014, [Retrieved on Jan. 6, 2020], retrieved from: URL<https://www.dash.org/>, 3 pages.

Extended European Search Report in European Application No. 19732229.0, dated May 12, 2020, 8 pages.

Github.com [online], "Coco-framework," May 2019, [Retrieved on Jan. 6, 2020], retrieved from URL: <https://github.com/Azure/coco-framework>, 2 pages.

Github.com [online], "Private-data-objects," Dec. 2019, [Retrieved on Jan. 6, 2020], retrieved from: URL<https://github.com/hyperledger-labs/private-data-objects>, 3 pages.

Github.com [online], "Quorum," Dec. 2019, [Retrieved on Jan. 6, 2020], retrieved from: URL<https://github.com/jpmorganchase/quorum>, 6 pages.

GitHub.com [online], "White Paper," available on or before Apr. 13, 2016, via Internet Archive: Wayback Machine URL<https://web.archive.org/web/20170508223232/https://github.com/ethereum/wiki/wiki/White-Paper>, retrieved on May 26, 2017, URL<https://github.com/ethereum/wiki/wiki/White-Paper>, 21 pages.

Kosba et al., "Hawk: The Blockchain Model of Cryptography and Privacy-Preserving Smart Contracts," 2016 IEEE Symposium on Security and Privacy, 2016, 839-858.

Lind et al., "Teechan: Payment channels using trusted execution environments," arXiv preprint arXiv:1612.07766, 2016, 14 pages.

Microsoft [online], "The Coco Framework Technical Overview," Aug. 2017, [Retrieved on Dec. 31, 2019], retrieved from URL<https://github.com/wooriapt/Coco-Framework-whitepaper/blob/master/Coco%20Framework%20whitepaper.pdf>, 27 pages.

Monero [online], "Private Digital Currency," 2019, [Retrieved on Jan. 6, 2020], retrieved from: URL<https://web.getmonero.org/>, 2 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/081180, dated Jan. 9, 2020, 6 pages.

Weiser et al., "SGXIO: Generic Trusted I/O Path for Intel SGX," Proceedings of the Seventh ACM on Conference on Data and Application Security and Privacy, 2017, 12 pages.

Wikipedia [Online], "Trusted execution environment," Dec. 23, 2019, [Retrieved on Dec. 29, 2019], retrieved from: URL<https://en.wikipedia.org/wiki/Trusted_execution_environment>, 6 pages.

Z.cash [online], "Zcash," 2019, [Retrieved on Jan. 7, 2020], retrieved from URL<https://z.cash/>, 2 pages.

Github.com [online], "White Paper—A Next-Generation Smart Contract and Decentralized Application Platform," available on or before Mar. 2019, via Internet Archive: Wayback Machine URL<https://web.archive.org/web/20190330045331/https://github.com/ethereum/wiki/wiki/White-Paper>, retrieved on Jan. 29, 2021, URL<https://github.com/ethereum/wiki/wiki/White-Paper>, 37 pages.

Mencias et al., "An Optimized Blockchain Solution for the IBM z14," IBM Journal of Research and Development, Jan. 2018, 62(2/3):1-16.

Buterin, ethereum.org [online], "Ethereum White Paper," Feb. 2021, retrieved on Apr. 27, 2021, retrieved from URL<https://ethereum.org/en/whitepaper/>, 40 pages.

Github.com [online], "Ethreum White Papter," Feb. 3, 2019, retrieved on Mar. 25, 2021, retrieved from URL<https://github.com/ethereum/wiki/wiki/[Japanese]-White-Paper>, 82 pages (with machine translation).

Intel.com [online], "An Introduction to creating a sample enclave using Intel Software Guard Extensions," Jul. 21, 2016, retrieved on Mar. 25, 2021, retrieved from URL<https://software.intel.com/content/www/us/en/develop/articles/intel-software-guard-extensions-developing-a-sample-enclave-application.html>, 12 pages.

Komatsu, "Proposal and Implementation of Remote Authentication Method for In-Process Processing," CSS2018 Proceedings of 2018 Computer Security Symposium, Dec. 2018, 2018:1066-1072 (with English abstract).

Blockchain technology textbook, 1st ed., C & R Research Institute Co., Apr. 23, 2018, pp. 140-161 (with machine translation).

Textbook for Blockchain Application Development, 1st ed., Mynavi Publishing Co., Jan. 31, 2018, pp. 64-74 (with machine translation).

\* cited by examiner

PROCESSING BLOCKCHAIN DATA BASED ON SMART CONTRACT OPERATIONS EXECUTED IN A TRUSTED EXECUTION ENVIRONMENT

CROSS-REFERENCE TO RELATED APPLICATIONS

This application is a continuation of and claims the benefit of priority of U.S. patent application Ser. No. 16/670,646, filed Oct. 31, 2019, which is a continuation of PCT Application No. PCT/CN2019/081180, filed on Apr. 3, 2019, which is hereby incorporated by reference in its entirety.

TECHNICAL FIELD

This specification relates to processing blockchain data under a trusted execution environment.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Smart contracts are programs that execute on blockchains. A smart contract contains a set of pre-defined rules under which the parties to that smart contract agree to interact with each other. Smart contracts can be executed by distributed computing platforms such as Ethereum. For example, the Ethereum virtual machine (EVM) provides the runtime environment for smart contracts in Ethereum. An Ethereum blockchain can be viewed as a transaction-based state machine. Ethereum can have a global shared-state referred to as a world state. The world state comprises a mapping between Ethereum account addresses and account states. The mapping is stored in a data structure known as a Merkle Patricia tree (MPT).

Although the Ethereum account states are often encrypted to protect account privacy, the encryption key used is the same for all accounts. As such, the data structure of the MPT can be preserved, so that the Merkle root can be calculated in the same way by all blockchain nodes for Merkle proof or state updates. However, by using the same encryption key among all accounts, the data structure of the world state cannot be hidden, and privacy information associated with account relationships and behaviors may be analyzed by attackers.

Accordingly, it would be desirable to retrieve and update the account values of a blockchain in a trusted execution environment and store the corresponding MPT in cyphertext to hide its data structure.

SUMMARY

This specification describes technologies for processing blockchain data based on smart contract operations executed in a trusted execution environment (TEE). These technologies generally involve receiving a request to execute one or more software instructions in a TEE executing on the blockchain node; determining data associated with one or more blockchain accounts to execute the one or more software instructions based on the request; traversing a global state of a blockchain stored in the TEE to locate the data; and executing the one or more software instructions based on the data.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
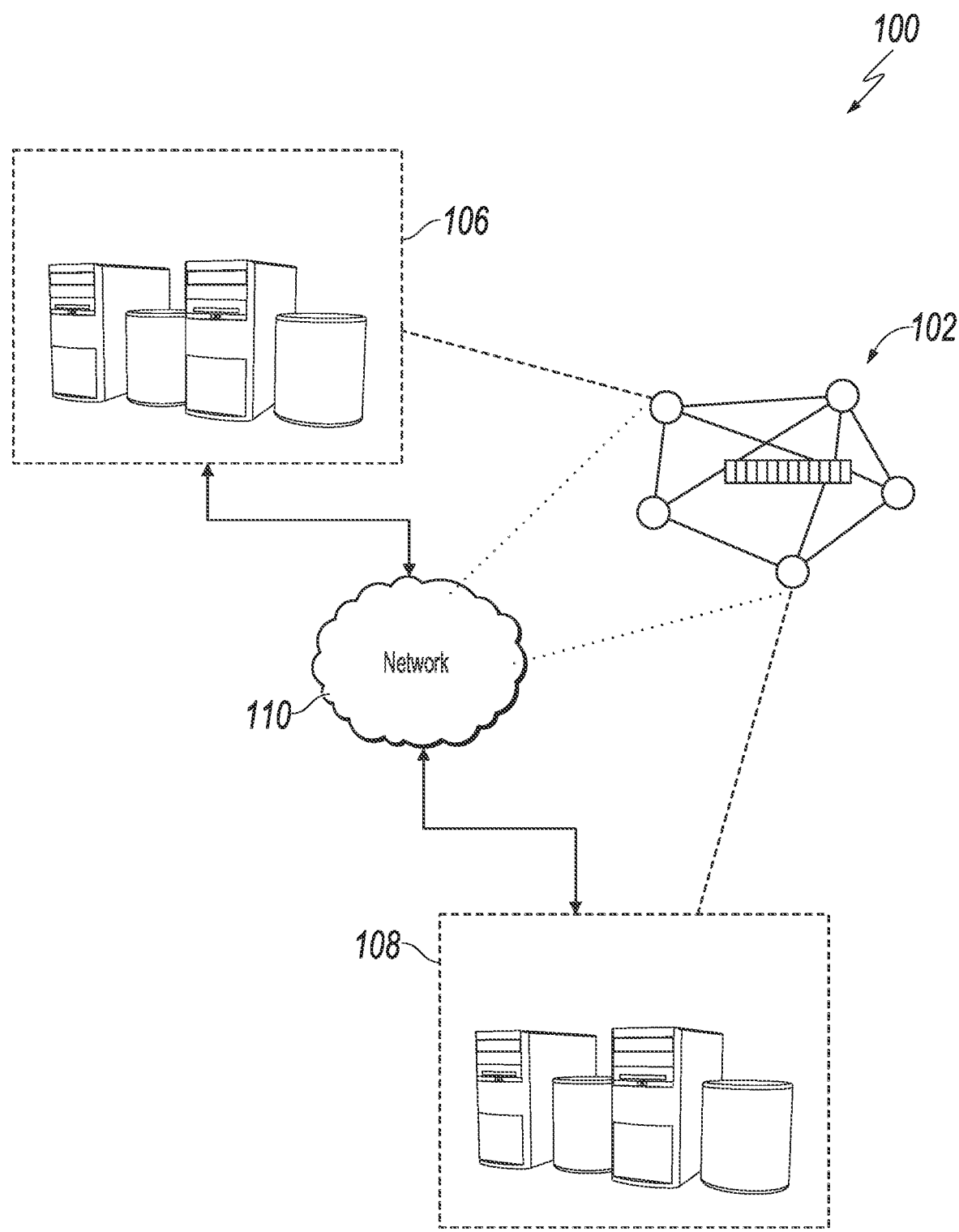
FIG. 1 is a diagram illustrating an example of an environment that can be used to execute embodiments of this specification.

This specification describes technologies for processing blockchain data based on smart contract operations executed in a trusted execution environment (TEE). These technologies generally involve receiving a request to execute one or more software instructions in a TEE executing on the blockchain node; determining data associated with one or more blockchain accounts to execute the one or more software instructions based on the request; traversing a global state of a blockchain stored in the TEE to locate the data; and executing the one or more software instructions based on the data.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
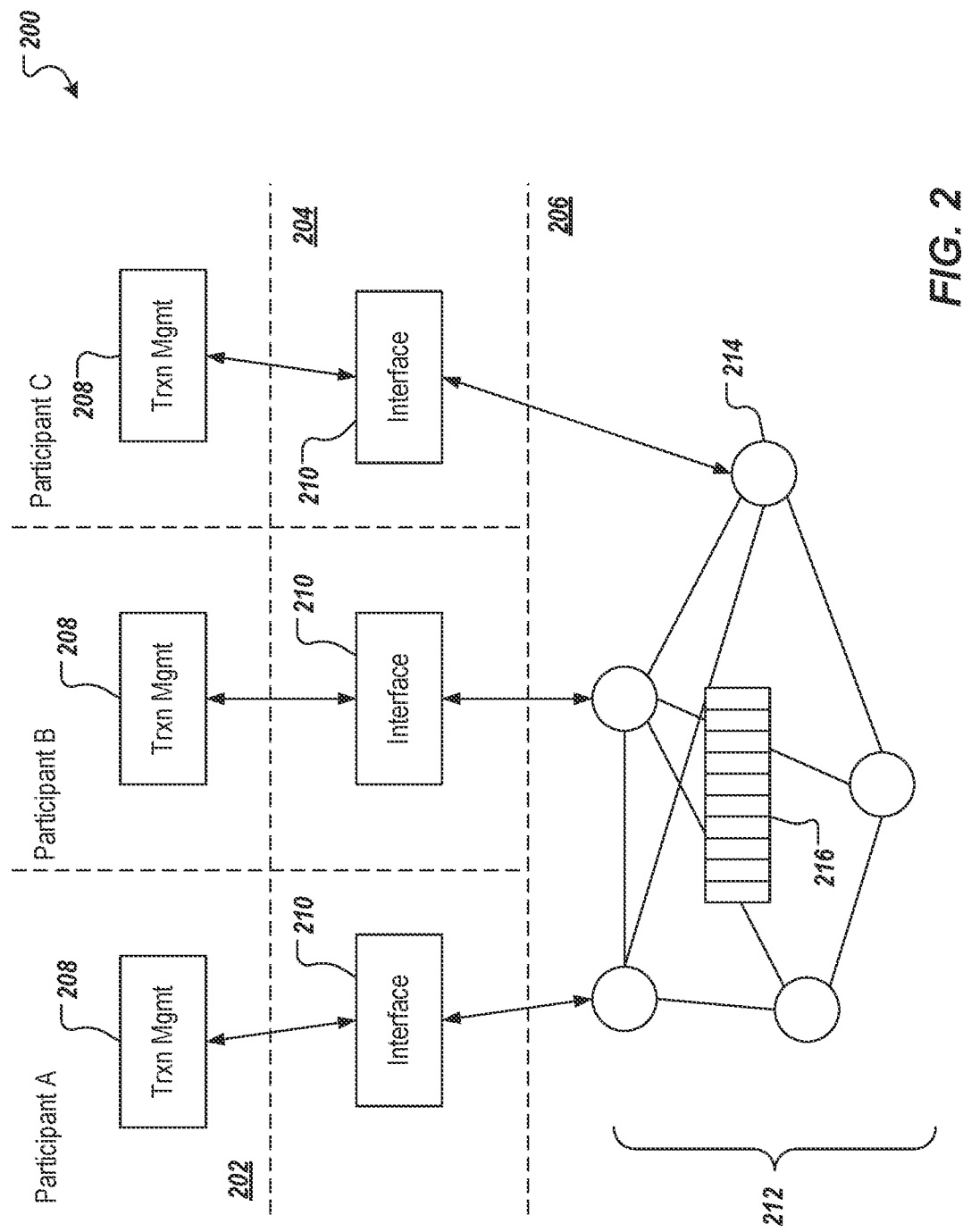
FIG. 2 is a diagram illustrating an example of an architecture in accordance with embodiments of this specification.

FIG. 2 depicts an example of an architecture 200 in accordance with embodiments of this specification. The architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, nodes of the blockchain network, and/or nodes that communicate with the blockchain network can operate using TEEs. At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE, and have access to the processor and memory. Through the TEE, the TAs are protected from other applications running in the main OS. Further, the TEE cryptographically isolates TAs from one another inside the TEE.

An example of a TEE includes Software Guard Extensions (SGX) provided by Intel Corporation of Santa Clara, Calif., United States. Although SGX is discussed herein by way of example, it is contemplated that embodiments of this specification can be realized using any appropriate TEE.

SGX provides a hardware-based TEE. In SGX, the trusted hardware is the die of the central processing until (CPU), and a portion of physical memory is isolated to protect select code and data. The isolated portions of memory are referred to as enclaves. More particularly, an enclave is provided as an enclave page cache (EPC) in memory and is mapped to an application address space. The memory (e.g., DRAM) includes a preserved random memory (PRM) for SGX. The PRM is a continuous memory space in the lowest BIOS level and cannot be accessed by any software. Each EPC is a memory set (e.g., 4 KB) that is allocated by an OS to load application data and code in the PRM. EPC metadata (EPCM) is the entry address for respective EPCs and ensures that each EPC can only be shared by one enclave. That is, a single enclave can use multiple EPCs, while an EPC is dedicated to a single enclave.

During execution of a TA, the processor operates in a so-called enclave mode when accessing data stored in an enclave. Operation in the enclave mode enforces an extra hardware check to each memory access. In SGX, a TA is compiled to a trusted portion, and an untrusted portion. The trusted portion is inaccessible by, for example, OS, BIOS, privileged system code, virtual machine manager (VMM), system management mode (SMM), and the like. In operation, the TA runs and creates an enclave within the PRM of the memory. A trusted function executed by the trusted portion within the enclave is called by the untrusted portion, and code executing within the enclave sees the data as plaintext data (unencrypted), and external access to the data is denied.

In some embodiments, a virtual machine operating inside of a TEE can provide a trusted runtime environment for applications to securely execute smart contracts. The virtual machine can receive calls from the applications outside of the TEE. The calls can invoke TEE interface functions to initiate execution of the smart contracts. During smart contract execution, the virtual machine can retrieve data from blockchain accounts based on input parameters of the calls or content of the smart contracts. Blockchain account addresses and corresponding account states are stored as key-value pairs in a data structure known as MPT. The MPT corresponds to a world state of the blockchain and is stored in the TEE in plaintext. After smart contract execution, one or more account states may change, new accounts may be added or removed. Accordingly, the world state of the blockchain can be updated inside the TEE based on hash encoding to reflect the changes to the account states. After the world state is updated, calls can be made from the TEE to store the updated MPT to a database outside of the TEE. The updated MPT output from the TEE can be encrypted to hide its structure and the data stored therein. Because the MPT is processed and updated inside the TEE and stored outside of the TEE in an encrypted form, the states, behaviors, and relationships of the blockchain accounts can be hidden from blockchain nodes that are not authorized to access such information (e.g., those without the proper key to decrypt the information).

Figure 3:
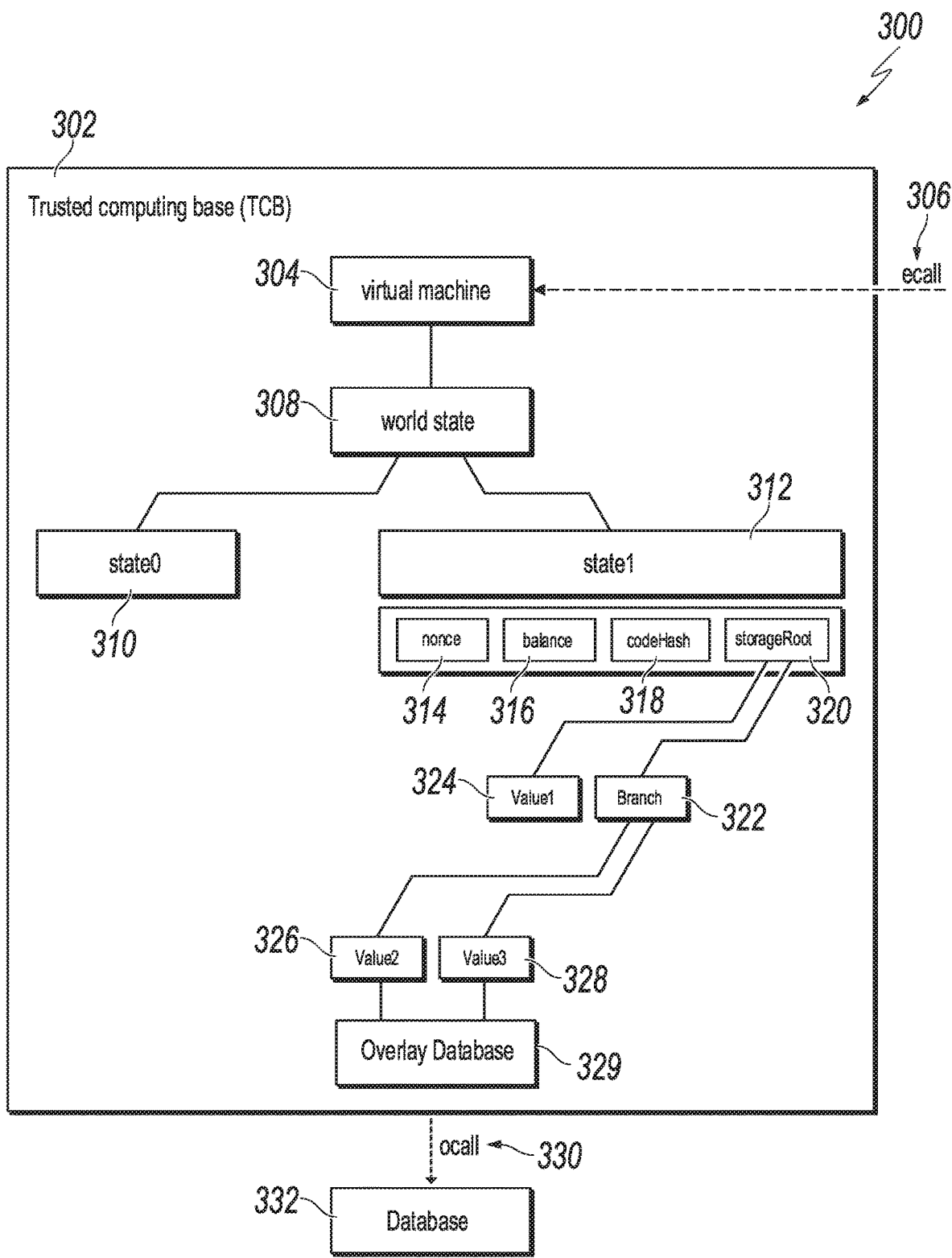
FIG. 3 is a diagram illustrating an example of a structure of a TEE in communication with a database outside of the TEE in accordance with embodiments of this specification.

FIG. 3 is a diagram illustrating an example of a structure 300 of a TEE in communication with a database outside of the TEE in accordance with embodiments of this specification. At a high-level, the structure 300 includes a TEE 302 that stores a virtual machine and a world state 308 of an MPT, and a database 332 in communications with the TEE 302.

As discussed above, a TA, such as an SGX enabled application, can include a trusted component (or enclave component) and an untrusted component (application component). The application component is located outside of the TEE 302 and can access the TEE's 302 TCB through enclave interface functions. In some embodiments, these enclave interface functions are an application programming interface (API) used by the application component. The application component can use the API to make "ecalls" 306 to invoke a virtual machine 304 in the TEE to execute smart contracts. The virtual machine can be a software program that executes program instructions encoded in a particular programming language or in a binary format such as a bitstream. In some cases, the virtual machine may provide an abstraction layer between the program instructions and the underlying hardware of the computing device executing the virtual machine. Such a configuration can allow for the same program instructions to be executed in the same way across different computing devices having different hardware.

In some implementations, the virtual machine can be an Ethereum virtual machine (EVM) under the context of an Ethereum blockchain. It is to be understood that other blockchain networks can use other types of of virtual machines. After receiving an ecall 306, the virtual machine 304 can identify one or more blockchain accounts related to executing a smart contract specified by the ecall 306. The identification can be based on one or more input parameters of the ecall 306. For example, an ecall 306 can be made by an application component to execute a smart contract for adding a new transaction between two blockchain accounts to the blockchain. The virtual machine 305 can identify keys (i.e., account addresses) to retrieve account balances from the corresponding account states. The virtual machine 304 can then calculate the account balances based on the transaction amount of the new transaction, and update the world state 308 accordingly based on hash encoding. Because data in the TEE 302 are in the format of plaintext, no decryption or encryption needs to be performed by the virtual machine 304 to update the world state 308.

The world state 308 can also be referred to as a global state of the blockchain network. The global state can include a mapping between account addresses and the account states of the blockchain. The mapping can be stored in a data structure known as an MPT. The account addresses and account states can be stored in the MPT as key value pairs (KVPs).

The global state MPT is a hash of the global state at a given point in time. The global state can include a root node used as a secure and unique identifier for the MPT. The global state MPT's root node can be cryptographically dependent on data representing the account states.

In the structure 300 depicted in FIG. 3, two accounts with respective account state 0 310 and account state 1 312 are shown under the world state 308. Although only two accounts are depicted in FIG. 3, in some implementations the blockchain can include large numbers of accounts (i.e., more than two). The accounts can be externally owned accounts and contract accounts. Externally owned accounts can be controlled by private keys and are not associated with any code. Contract accounts can be controlled by their contract code and have code associated with them.

In some embodiments, the account state can include four components as shown under state 1 312. The four components are nonce 314, balance 316, codeHash 318, and storageRoot 320. If the account is an externally owned account, the nonce 314 can represent the number of transactions sent from the account address. The balance 316 can represent the digital assets owned by the account. The codeHash 318 is the hash of an empty string. The storageRoot 320 is empty. If the account is a contract account, the nonce 314 can represent the number of contracts created by the account. The balance 316 can represent the digital assets owned by the account. The codeHash 318 can be the hash of a virtual machine code associated with the account. The storageRoot 320 can store a hash of the root node of an MPT referred to as a storage tree. The storage tree can store contract data by encoding the hash of the storage contents of the account. Since the storage tree also has a data structure of an MPT, it can include one or more branch nodes and leaf nodes that store contract data or variables. In the structure 300 depicted in FIG. 3, the storage tree includes a branch node 322 and three leaf nodes that store value1 324, value2 326, and value3 328. It is to be understood that the storage tree can include additional branch nodes and leaf nodes.

Based on content of ecalls 306, the account state or storage content of the storageRoot 320 can be retrieved by the virtual machine 304 to execute the smart contracts. The execution results can be used to update the world state 308 or the storage tree under the storageRoot 320. In some embodiments, the world state 308 is stored as an MPT. In such cases, only leaf nodes of the MPT that contain the data and the nodes going up the branch relevant to the leaf nodes need to be updated with the execution results. Afterwards, the virtual machine 304 can make a call (known as an ocall 330) from within the TEE 302 to store the world state 308 in a database 332. In some examples, the database 332 can be databases for KVPs, such as RocksDB or LevelDB. In some embodiments, the world state 308 can be encrypted and stored in a cache first before cache syncing to databases for KVPs. In some examples, the cache can be an overlay DB 329. The overlay DB 329 can be included in the TCB 302 or can be visited from the TEE 302 through direct memory access. In some embodiments, the world state 308 is encrypted before exiting the TEE 302. As such, the world state 308 stored outside of the TEE 302 cannot be viewed without obtaining the corresponding decryption key.

By including the world state 308 in the TEE 302, the data retrieval and content update of the corresponding MPT can be performed in a trusted environment inside the TEE 302. The world state 308 is output from the TEE 302 in an encrypted form after it is updated. As such, the data structure, account relationships, and account behaviors of the world state 302 cannot be detected from outside of the TEE 302 without the appropriate cryptographic key. The data privacy of the blockchain accounts can be enhanced.

Figure 4:
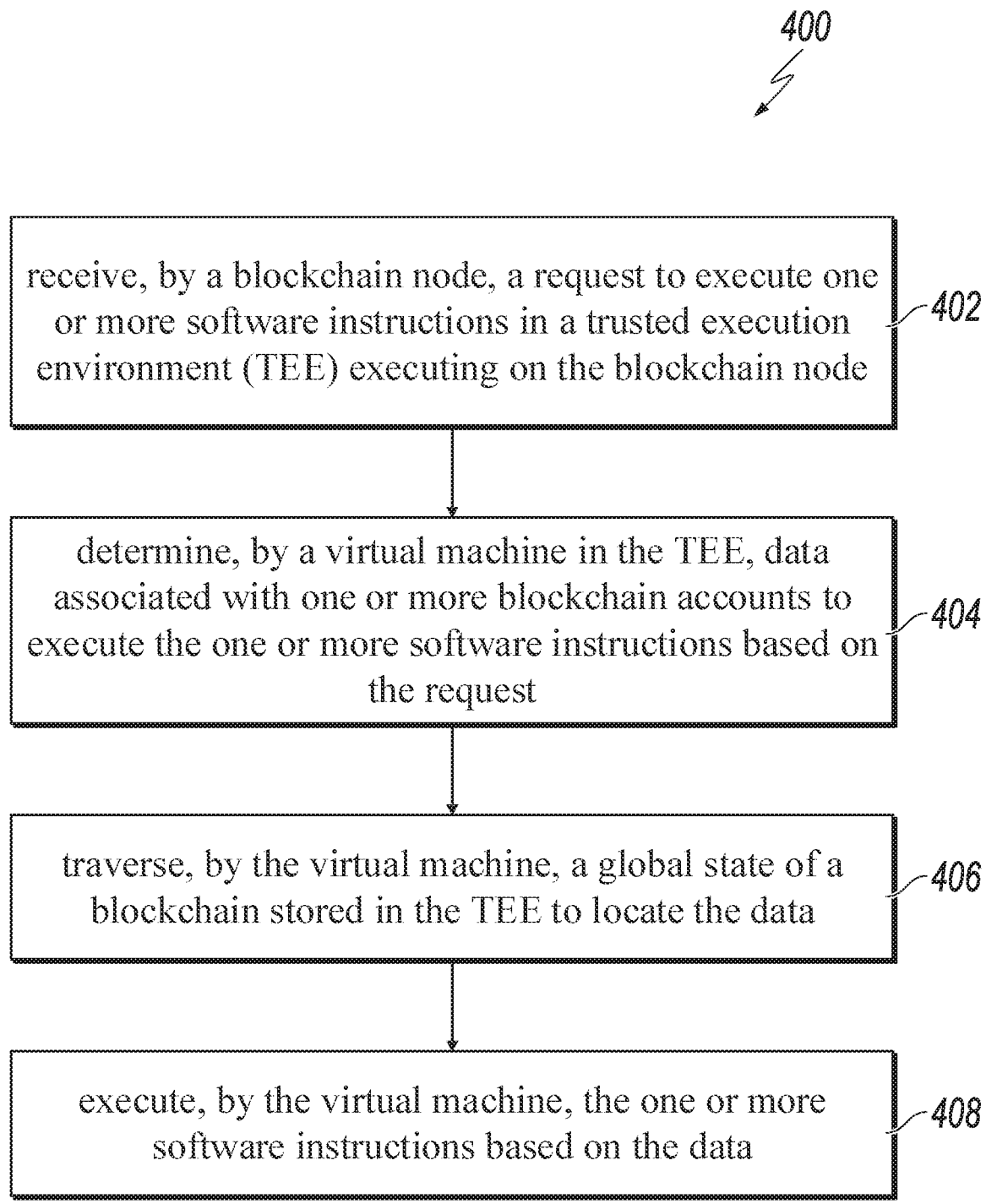
FIG. 4 is a flowchart of an example of a process in accordance with embodiments of this specification.

FIG. 4 is a flowchart of an example of a process 400 in accordance with embodiments of this specification. For convenience, the process 400 will be described as being performed by a system of one or more computers, located in one or more locations, and programmed appropriately in accordance with this specification. For example, computing systems 106, 108 of FIG. 1, appropriately programmed, can perform the process 400.

At 402, a blockchain node receives a request to execute one or more software instructions in an enclave of the blockchain node. The enclave is a TEE executing on the blockchain node. In some examples, the request is received through an API associated with the enclave. In some embodiments, the applications outside of the enclave can make ecalls (i.e., the request) to the enclave to execute smart contracts in a trusted computing environment. The API can be used by the applications to call in. In some embodiments, the request can include one or more input parameters and are made to the enclave interface function of the enclave.

At 404, a virtual machine in a TCB of the enclave of the blockchain node determines data associated with one or more blockchain accounts to execute the one or more software instructions based on the request. In some examples, a global state of the blockchain stored in the TCB is updated during execution of the one or more software instructions to produce an updated global state. In some examples, the global state is referred to as a world state. The global state can be stored in the TCB and can include a mapping between addresses and states of a plurality of blockchain accounts of the blockchain. In some embodiments, the global state is stored in the TCB as an MPT. In some embodiments, the plurality of blockchain accounts include one or more externally owned accounts or contract accounts. Each of the contract accounts includes a storage root. In some embodiments, the storage root includes a hash of a root node of an MPT. The MPT corresponding to the storage root encodes hash of storage contents of the corresponding contract account.

At 406, the virtual machine traverses a global state of a blockchain stored in the TEE to locate the data. In some embodiments, the updated global state is produced by updating the MPT that encodes the hash of the storage contents of the corresponding contract account.

At 408, the blockchain node executes the one or more software instructions based on the data. In some embodiments, the updated global state is encrypted before stored to the database outside of the enclave. In some embodiments, the databased can be a RocksDB or LevelDB.

Figure 5:
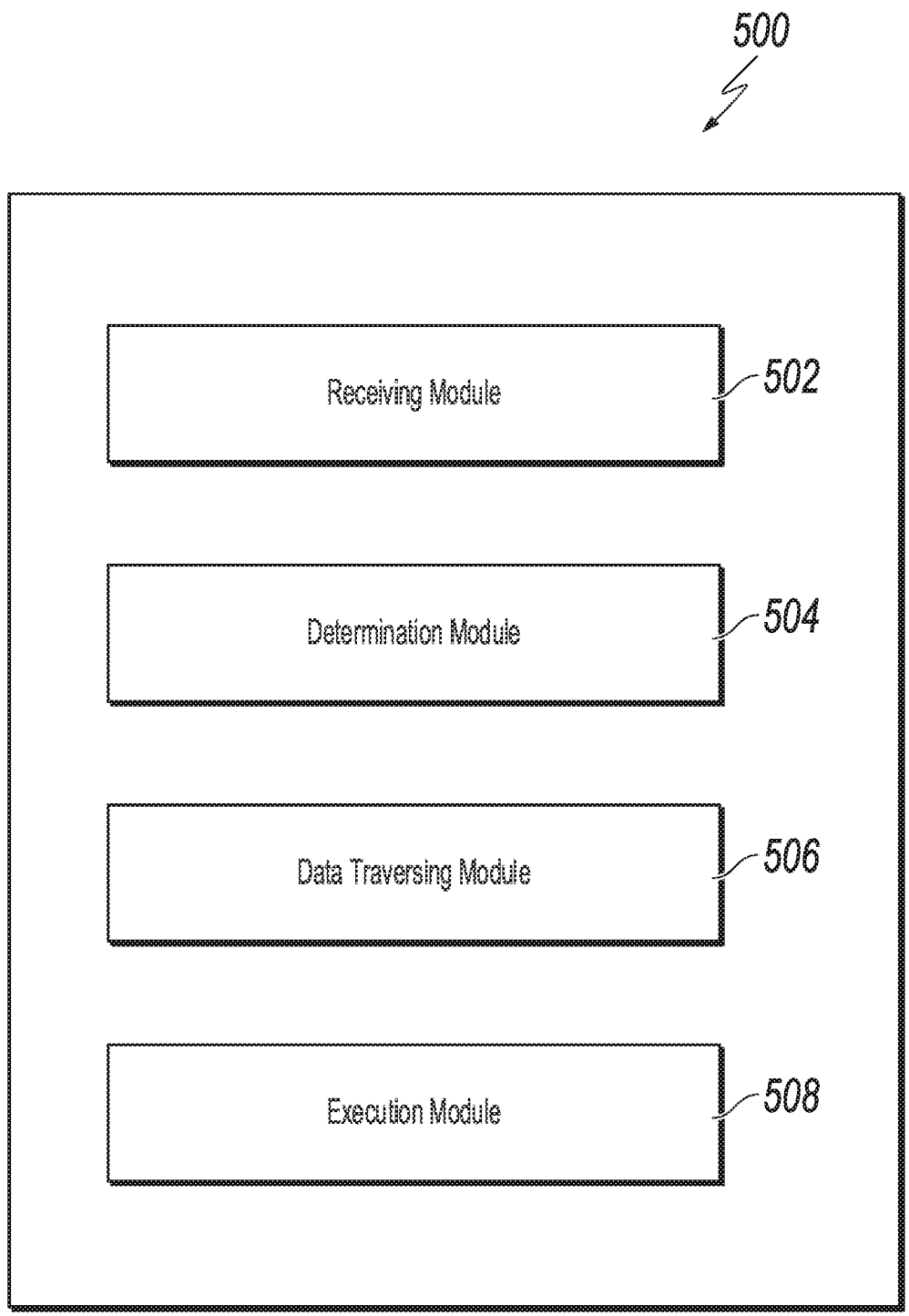
FIG. 5 depicts examples of modules of an apparatus in accordance with embodiments of this specification.

FIG. 5 is a diagram of on example of modules of an apparatus 500 in accordance with embodiments of this specification. The apparatus 500 can be an example of an embodiment of a trusted hardware including portions of the CPU and physical memory. The apparatus 500 can correspond to the embodiments described above, and the apparatus 500 includes the following: a receiving module 502 for receiving a request to execute one or more software instructions in a trusted execution environment (TEE) executing on the blockchain node; a determination module 504 for determining data associated with one or more blockchain accounts to execute the one or more software instructions based on the request; a traversing module 506 for traversing a global state of a blockchain stored in the TEE to locate the data; and an execution module 508 for executing the one or more software instructions based on the data.

Optionally, the request includes one or more input parameters and is made to an enclave interface function of the enclave.

Optionally, the global state is stored in the TCB as a MPT.

Optionally, the global state includes a mapping between addresses and states of a plurality of blockchain accounts of the blockchain, and the plurality of blockchain accounts include one or more of externally owned accounts or contract accounts, and wherein each of the contracts accounts includes a storage root.

Optionally, the storage root includes a hash of a root node of an MPT, and wherein the MPT encodes hash of storage contents of the corresponding contract account.

Optionally, the updated global state is produced by updating the MPT that encodes the hash of the storage contents of the corresponding contract account.

Optionally, the storage location separate from the enclave is associated with a cache or a database.

The techniques described in this specification produce one or more technical effects. For example, embodiments of the subject matter permit a blockchain virtual machine running in a trusted environment to receive calls from applications outside of a TEE to execute smart contracts. By storing the world state of the blockchain inside the TEE, the virtual machine can retrieve blockchain data from within the TEE to reduce data traffic between trusted and untrusted components. Because data traveling between the trusted and untrusted components need to be encrypted or decrypted, less data traffic through enclave can result in less computational resource consumption and higher data security. Moreover, by including the world state within the TEE, the data retrieval and content update of the world state can be performed based on plaintext in a trusted environment. The world state is output to a database outside of the enclave after it is updated and encrypted, such that the data structure, account relationships, and account behaviors of the world state cannot be revealed from outside of the TEE. The data privacy of the blockchain accounts can be enhanced.

The described methodology permits enhancement of various blockchain transactions and overall transaction/data security. Blockchain users that initiate the call to execute smart contracts can be confident that the computations are performed in a trusted environment and the computational results cannot be altered. The updated world state can be encrypted in batch to hide the data structure and permit higher-level security of underlying data and transactions, as identifying blockchain account behaviors and relationships becomes extremely difficult or impossible with only cyphertext of the blockchain world state is stored outside of the TEE.

The described methodology can ensure the efficient usage of computer resources (for example, processing cycles, network bandwidth, and memory usage), because blockchain data from the world state are stored in plaintext, and retrieved and updated inside of the TEE. At least these actions can minimize or prevent waste of available computer resources with respect to blockchain data encryption and decryption. Instead of virtual machines needing to decrypt data for smart contract processing, virtual machine can directly operate on plaintext inside of the enclave.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Described embodiments of the subject matter can include one or more features, alone or in combination.

For example, in a first embodiment, receiving, by a blockchain node, a request to execute one or more software instructions in a trusted execution environment (TEE) executing on the blockchain node; determining, by a virtual machine in the TEE, data associated with one or more blockchain accounts to execute the one or more software instructions based on the request; traversing, by the virtual machine, a global state of a blockchain stored in the TEE to locate the data; and executing, by the virtual machine, the one or more software instructions based on the data.

The foregoing and other described embodiments can each, optionally, include one or more of the following features:

A first feature, combinable with any of the following features, specifies that the request includes one or more input parameters and is made to an interface function of the TEE.

A second feature, combinable with any of the previous or following features, specifies that wherein the global state is stored in the TEE as a Merkle Patricia tree (MPT).

A third feature, combinable with any of the previous or following features, specifies that wherein the global state includes a mapping between addresses and states of a plurality of blockchain accounts of the blockchain, and the plurality of blockchain accounts include one or more of externally owned accounts or contract accounts, and wherein each of the contracts accounts includes a storage root.

A fourth feature, combinable with any of the previous or following features, specifies that the storage root includes a hash of a root node of an MPT, and wherein the MPT encodes hash of storage contents of the corresponding contract account.

A fifth feature, combinable with any of the previous or following features, specifies that the updated global state is produced by updating the MPT that encodes the hash of the storage contents of the corresponding contract account.

A sixth feature, combinable with any of the previous or following features, specifies that the storage location separate from the TEE is associated with a cache or a database.

A seventh feature, combinable with any of the previous or following features, specifies that the request is received through an application programming interface associated with the TEE.

A eighth feature, combinable with any of the previous or following features, specifies that the global state of a blockchain stored in the TEE is updated during execution of the one or more software instructions to produce an updated global state, and the computer-implemented method further comprises: in response to executing the one or more software instructions, generating, by the blockchain node, an encrypted representation of the updated global state; and storing, by the blockchain node, the encrypted representation of the updated global state in a storage location separate from the TEE Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing blockchain data under a trusted execution environment (TEE), the method comprising:
   receiving, by a blockchain node, a request to execute one or more software instructions in the TEE executing on the blockchain node;
   determining, by a virtual machine in the TEE based on the request, data associated with one or more blockchain accounts related to the execution of the one or more software instructions;
   traversing, by the virtual machine, a global state of a blockchain stored in the TEE to locate the data associated with the one or more blockchain accounts;
   generating, by the virtual machine, an updated global state by encoding a hash of a storage content of the one or more blockchain accounts;
   in response to executing the one or more software instructions, generating, by the blockchain node, an encrypted representation of the updated global state; and
   storing, by the blockchain node, the encrypted representation of the updated global state in a cache separate from the TEE for cache syncing the encrypted representation of the updated global state to a database of a trusted computing base that is separate from the TEE.

2. The computer-implemented method of claim 1, wherein the encrypted representation of the updated global state is generated using a private key of the blockchain node.

3. The computer-implemented method of claim 1, wherein the request includes one or more input parameters and is made to an interface function of the TEE.

4. The computer-implemented method of claim 1, wherein the global state is stored in the TEE as a Merkle Patricia tree (MPT).

5. The computer-implemented method of claim 1, wherein the global state includes a mapping between addresses and states of the one or more blockchain accounts of the blockchain, and the one or more blockchain accounts include one or more of externally owned accounts or contract accounts, and wherein each of the contracts accounts includes a storage root.

6. The computer-implemented method of claim 5, wherein the storage root includes a root node hash of a Merkle Patricia tree (MPT), and wherein the MPT encodes a hash of storage content of a corresponding contract account.

7. The computer-implemented method of claim 6, wherein the updated global state is produced by updating the MPT that encodes the hash of the storage content of the corresponding contract account.

8. The computer-implemented method of claim 1, wherein the cache comprises an overlay database accessible from the TEE through direct memory access.

9. The computer-implemented method of claim 1, wherein the request is received through an application programming interface associated with the TEE.

10. A non-transitory, computer-readable storage medium storing one or more instructions executable by a computer system to perform operations for processing blockchain data under a trusted execution environment (TEE), the operations comprising:
    receiving, by a blockchain node, a request to execute one or more software instructions in the TEE executing on the blockchain node;
    determining, by a virtual machine in the TEE based on the request, data associated with one or more blockchain accounts related to the execution of the one or more software instructions;
    traversing, by the virtual machine, a global state of a blockchain stored in the TEE to locate the data associated with the one or more blockchain accounts;
    generating, by the virtual machine, an updated global state by encoding a hash of a storage content of the one or more blockchain accounts;

in response to executing the one or more software instructions, generating, by the blockchain node, an encrypted representation of the updated global state; and storing, by the blockchain node, the encrypted representation of the updated global state in a cache separate from the TEE for cache syncing the encrypted representation of the updated global state to a database of a trusted computing base that is separate from the TEE.

11. The non-transitory, computer-readable storage medium of claim 10, wherein the encrypted representation of the updated global state is generated using a private key of the blockchain node.

12. The non-transitory, computer-readable storage medium of claim 10, wherein the request includes one or more input parameters and is made to an interface function of the TEE.

13. The non-transitory, computer-readable storage medium of claim 10, wherein the global state is stored in the TEE as a Merkle Patricia tree (MPT).

14. The non-transitory, computer-readable storage medium of claim 10, wherein the global state includes a mapping between addresses and states of the one or more blockchain accounts of the blockchain, and the one or more blockchain accounts include one or more of externally owned accounts or contract accounts, and wherein each of the contracts accounts includes a storage root.

15. The non-transitory, computer-readable storage medium of claim 14, wherein the storage root includes a root node hash of a Merkle Patricia tree (MPT), and wherein the MPT encodes a hash of storage content of a corresponding contract account.

16. The non-transitory, computer-readable storage medium of claim 15, wherein the updated global state is produced by updating the MPT that encodes the hash of the storage content of the corresponding contract account.

17. The non-transitory, computer-readable storage medium of claim 10, wherein the cache comprises an overlay database accessible from the TEE through direct memory access.

18. The non-transitory, computer-readable storage medium of claim 10, wherein the request is received through an application programming interface associated with the TEE.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for processing blockchain data under a trusted execution environment (TEE), the operations comprising:

receiving, by a blockchain node, a request to execute one or more software instructions in the TEE executing on the blockchain node, determining, by a virtual machine in the TEE based on the request, data associated with one or more blockchain accounts related to the execution of the one or more software instructions, traversing, by the virtual machine, a global state of a blockchain stored in the TEE to locate the data associated with the one or more blockchain accounts, generating, by the virtual machine, an updated global state by encoding a hash of a storage content of the one or more blockchain accounts, in response to executing the one or more software instructions, generating, by the blockchain node, an encrypted representation of the updated global state, and storing, by the blockchain node, the encrypted representation of the updated global state in a cache separate from the TEE for cache syncing the encrypted representation of the updated global state to a database of a trusted computing base that is separate from the TEE.

20. The system of claim 19, wherein the encrypted representation of the updated global state is generated using a private key of the blockchain node.

21. The system of claim 19, wherein the request includes one or more input parameters and is made to an interface function of the TEE.

22. The system of claim 19, wherein the global state is stored in the TEE as a Merkle Patricia tree (MPT).

23. The system of claim 19, wherein the global state includes a mapping between addresses and states of the one or more blockchain accounts of the blockchain, and the one or more blockchain accounts include one or more of externally owned accounts or contract accounts, and wherein each of the contracts accounts includes a storage root.

24. The system of claim 23, wherein the storage root includes a root node hash of a Merkle Patricia tree (MPT), and wherein the MPT encodes a hash of storage content of a corresponding contract account.

25. The system of claim 24, wherein the updated global state is produced by updating the MPT that encodes the hash of the storage content of the corresponding contract account.

26. The system of claim 19, wherein the cache comprises an overlay database accessible from the TEE through direct memory access.

27. The system of claim 19, wherein the request is received through an application programming interface associated with the TEE.

* * * * *